(12) United States Patent
Bavoil et al.

(10) Patent No.: US 8,223,149 B2
(45) Date of Patent: *Jul. 17, 2012

(54) CONE-CULLED SOFT SHADOWS

(75) Inventors: Louis Frederic Bavoil, Feucherolles (FR); Alan Bryant Heirich, Half Moon Bay, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/793,357

(22) Filed: Jun. 3, 2010

(65) Prior Publication Data

US 2010/0238172 A1 Sep. 23, 2010

Related U.S. Application Data

(63) Continuation of application No. 11/418,415, filed on May 3, 2006, now Pat. No. 7,755,626.

(51) Int. Cl.
*G06T 15/60* (2006.01)
*G06T 15/50* (2011.01)
*G06T 15/00* (2011.01)

(52) U.S. Cl. ........................ 345/426; 345/419
(58) Field of Classification Search .................. None
See application file for complete search history.

(56) References Cited

U.S. PATENT DOCUMENTS

| 6,359,618 B1 | 3/2002 | Heirich |
| 2002/0140703 A1 | 10/2002 | Baker et al. |
| 2003/0112237 A1 | 6/2003 | Corbetta |

OTHER PUBLICATIONS

Haines, E., and Möller, T. Real-Time Shadows. In Game Developers Conference, CMP 2001.*
Michael D. McCool. 2000. Shadow volume reconstruction from depth maps. ACM Trans. Graph. 19, 1 (Jan. 2000), 1-26.*
Assarsson, U., Dougherty, M., Mounier, M., and Akenine-Möller, T. 2003. An Optimized soft shadow volume algorithm with real-time performance. In Proceeding of the ACM SIGGRAPH/Eurographics Conference on Graphics Hardware. Eurographics Association.
Cass Everitt. Interactive order-independent transparency. Technical Report, NVIDIA Corporation, May 2001, Available at http://www.nvidia.com/.
Hasenfratz, J; Lapierre, M; Holzschuch, N; Sillion, F.; "A Survey of Real-time Soft Shadows Algorithms", Computer Graphics Forum, vol. 2, No. 4, Dec. 2003.
Lionel Atty, Nicolas Holzschuch, Marc Lapierre, Jean-Marc Hasenfratz, Chuck Hansen, François Sillion, Soft Shadow Maps: Efficient Sampling of Light Source Visibility. Research Report, INRIA, No. RR-5750. Nov. 2005.

* cited by examiner

*Primary Examiner* — Daniel Hajnik
(74) *Attorney, Agent, or Firm* — Kilpatrick Townsend & Stockton LLP (57) ABSTRACT

Soft shadows in computer graphics images are created by rendering the scene from the camera viewpoint and at least one light viewpoint. The positions of scene fragments and light fragments in the scene are stored. For each scene fragment, a frustum is defined between the position of the scene fragment and the light source. Light fragments are evaluated with respect to the frustum to select light fragments blocking light between the light source and the scene fragment. A color or monochromatic shading value is determined for each scene fragment that indicates the amount of light blocked or transmitted by the light fragments. The shading values are then used to alter scene fragments accordingly. Computer graphics images with soft shadows can be created entirely by a graphics processing subsystem or by a graphics processing subsystem in conjunction with a central processing unit using a pipelined, deferred shading approach.

20 Claims, 12 Drawing Sheets

| EXECUTION PHASE | GPU | CPU |
|---|---|---|
| 1 | FRAME 1: EYE, LIGHT, UNSHADED IMAGE BUFFERS | ---- |
| 2 | FRAME 2: EYE, LIGHT, UNSHADED IMAGE BUFFERS | FRAME 1: SHADING BUFFER |
| 3 | FRAME 3: EYE, LIGHT, UNSHADED IMAGE BUFFERS<br><br>FRAME 1: COMBINE SHADING AND UNSHADED IMAGE BUFFERS | FRAME 2: SHADING BUFFER |
| 4 | FRAME 4: EYE, LIGHT, UNSHADED IMAGE BUFFERS<br>FRAME 2: COMBINE SHADING AND UNSHADED IMAGE BUFFERS | FRAME 3: SHADING BUFFER |

CONE-CULLED SOFT SHADOWS

CROSS-REFERENCES TO RELATED APPLICATIONS

This is a continuation application of U.S. patent application Ser. No. 11/418,415, filed May 3, 2006 (issued Jul. 13, 2010 as U.S. Pat. No. 7,755,626), which is incorporated by reference herein for all purposes.

BACKGROUND OF THE INVENTION

The present invention relates to the field of computer graphics. Many computer graphic images are created by mathematically modeling the interaction of light with a three dimensional scene from a given viewpoint. This process, called rendering, generates a two-dimensional image of the scene from the given viewpoint, and is analogous to taking a photograph of a real-world scene. A great deal of effort has been devoted to generating realistic and artistically compelling computer graphics images and animation.

Shadows are among the most important psychophysical clues for judging the relative size, positions, and shapes of objects. Shadows also enhance the mood and visual impact of scenes.

There are numerous algorithms and rendering techniques for generating shadows in computer graphics images. Ray tracing and global illumination rendering algorithms can create images with realistic looking shadows. However, these two rendering algorithms are computationally expensive and typically cannot be used for real-time rendering applications.

Real-time rendering algorithms, such as rasterization algorithms, are commonly used to create computer graphics images at interactive frame rates. Real-time rendering algorithms can be implemented in software executed by a general purpose central processing unit (CPU) and optionally a graphics processing subsystem (GPU), which includes hardware specifically adapted to create computer graphics images by performing operations such as geometry tessellation; transformation; clipping; rasterization; lighting, shading, and texture mapping operations; occlusion and z-buffer evaluation; and/or blending and compositing operations.

Real-time rendering algorithms can apply shadow volume and/or shadow mapping techniques to create shadows. Typical shadow volume and shadow mapping techniques tend to produce shadows with abrupt, sharply defined boundaries between the lit and shadowed areas. However, real-world light sources typically produce shadows with soft or partially shadowed boundaries between the lit and shadowed areas, referred to soft shadows. As a result, the shadows generated by typical real-time rendering algorithms look harsh and unrealistic.

Some improved real-time shadow algorithms use image filters, multiple samples of rendering data, and/or multiple rendering passes to generate soft shadows. However, these techniques are time-consuming, low quality, and/or require extensive pre-processing, making them unacceptable for real-time rendering of dynamic scenes. Moreover, these algorithms cannot correctly render shadows cast by translucent objects or colored shadows, which can be introduced by colored light sources.

It is therefore desirable for a system and method to efficiently create realistic looking soft shadows in computer graphics images that are suitable for use with real-time rendering algorithms. It is further desirable for the system and method to generate soft shadows without the need for pre-processing, making it suitable for use with dynamic scenes. It is also desirable for the system and method to be capable of generating soft shadows for translucent objects and colored shadows. It is still further desirable for the system and method to be readily adaptable for efficient implementation in conventional computers systems and/or graphics processing subsystems, as well as multithreaded, multiprocessor, and/or multiple core parallel processing systems.

BRIEF SUMMARY OF THE INVENTION

An embodiment of the invention can create realistic-looking and dynamic soft shadows in computer graphics images. In an embodiment, the scene is rendered from the camera viewpoint and the positions of scene fragments in the scene are stored in a first buffer. The scene is also rendered from the viewpoint of at least one light, and the positions of light fragments in the scene are stored in a second buffer. For each scene fragment, a frustum is defined between the position of the scene fragment and the light source. Light fragments in the second buffer are evaluated with respect to the frustum to select light fragments blocking light between the light source and the scene fragment. A shading value is determined for each scene fragment based on its respective selected light fragments that indicates the amount of light blocked by the light fragments. The shading values are then used to lighten or darken scene fragments accordingly. Embodiments of the invention can be executed entirely by a graphics processing system or a graphics processing system in conjunction with a central processing unit using a pipelined, deferred shading approach.

BRIEF DESCRIPTION OF THE DRAWINGS

The invention will be described with reference to the drawings, in which.

DETAILED DESCRIPTION OF THE INVENTION

Figure 1:
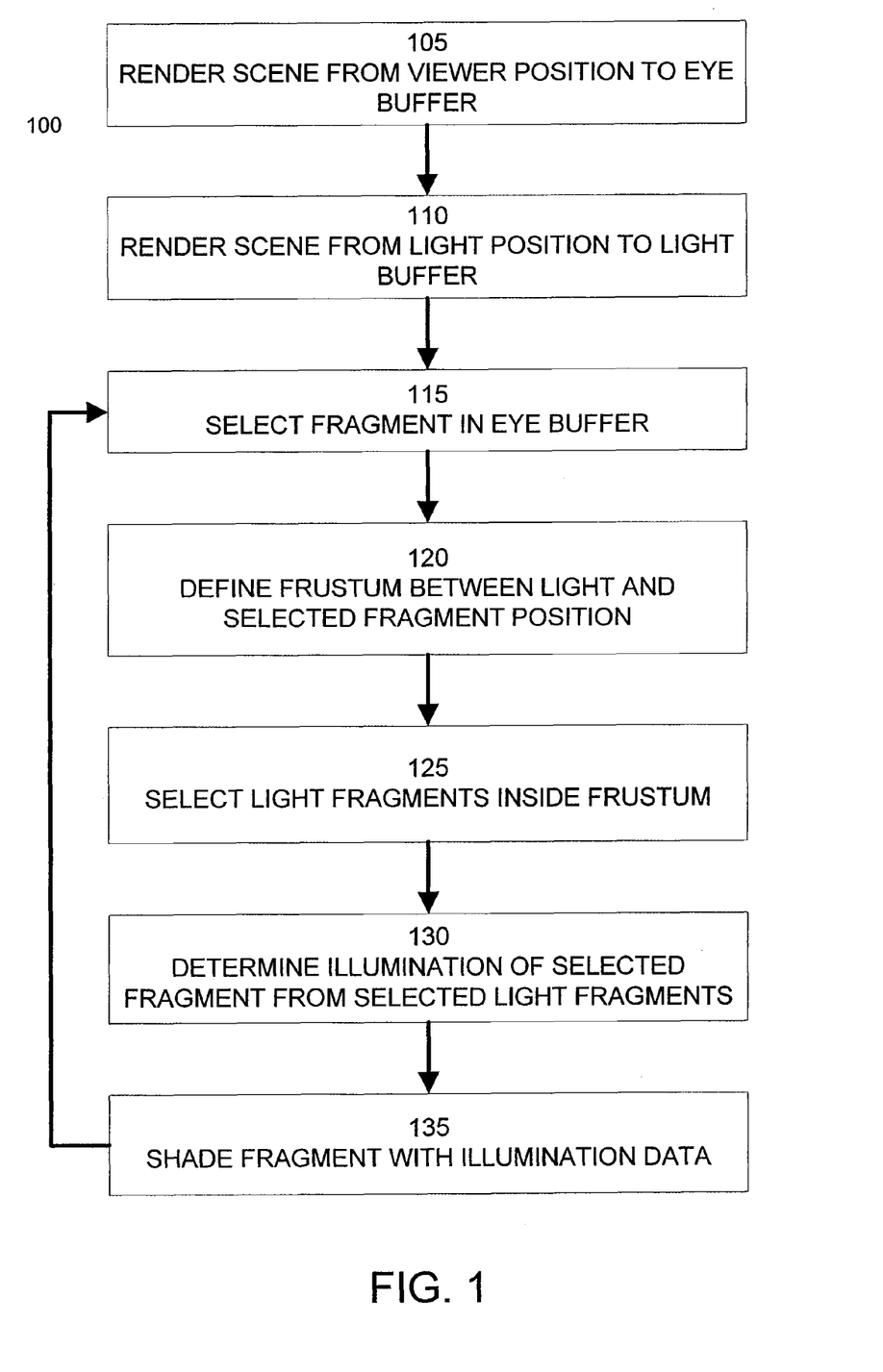
FIG. 1 illustrates a method of generating soft shadows according to an embodiment of the invention.

FIG. 1 illustrates a method 100 of generating soft shadows according to an embodiment of the invention. Step 105 renders a scene from the position of a virtual "camera" or viewer. Step 105 can employ any rendering technique known in the art, such as ray tracing, rasterization, scanline rendering, or deferred rendering or shading techniques. Moreover, the scene can be defined using any technique known in the art for defining three-dimensional geometry, including points, lines, polygons, quadratic or higher order surfaces, and subdivision surfaces.

Step 105 generates a set of fragments representing the portion of the scene visible from the point of view of the camera. Each fragment represents a sample of the scene. This set of fragments is stored in a data structure referred to as the eye buffer. Each fragment in the eye buffer is associated with an image space position representing the location of the fragment projected onto an image plane specified by the camera. In embodiments of method 100, background portions of the scenes are either not included in the eye buffer or marked as background fragments. Background portions of the scene can include fragments associated with the empty space or sky, distant objects that do not affect the shading of objects near the camera, or any other objects or portions of the scene that are to be excluded from the application of these shadow generation techniques, such as portions to be shaded using other shading techniques. In alternate embodiments, fragments to be shadowed can be created and identified in other techniques independent of the viewpoint.

In an embodiment, step 105 determines attributes for each fragment in the eye buffer including the position of each fragment in the world space coordinate system (or any other convenient scene-related coordinate system) and an opacity value of the fragment. In embodiments, the opacity value can be a scalar value representing the fragment's opacity to white light or a vector value representing the fragment's opacity to different colors of light. In some implementations, step 105 sets the opacity value for empty eye buffer elements to zero.

As discussed in detail below, step 105 can also determine any other fragment attributes necessary to determine the visual attributes of the final rendered image, such as color and texture mapping values. These additional attributes can be generated using any rendering technique known in the art and are unimportant for creating soft shadows in accordance with embodiments of the invention. Although not used for generating soft shadows, these additional attributes can be stored in the eye buffer for convenience or alternatively in a separate data structure.

In an embodiment, the image space position of each fragment may be implicit in the data structure format of the eye buffer. For example, in an M by N size eye buffer, the first element of the eye buffer stores the fragment projected onto the image space position of (0,0), the Mth element of the eye buffer stores the fragment projected onto the image space position of (M−1,0), and the M*Nth element of the eye buffer stores the fragment projected onto the image space position of (M−1,N−1).

In another embodiment, the eye buffer may arrange fragment attributes in a packed data format suitable for processing by single instruction, multiple data (SIMD) operations. For example, if each fragment includes X, Y, and Z position attributes, the attributes of four fragments (F1, F2, F3, and F4) may be stored in eye buffer elements in the following order: $X_{F1}$, $X_{F2}$, $X_{F3}$, $X_{F4}$, $Y_{F1}$, $Y_{F2}$, $Y_{F3}$, $Y_{F4}$, $Z_{F1}$, $Z_{F2}$, $Z_{F3}$, and $Z_{F4}$. This example arrangement facilitates the processing of four fragments in parallel using SIMD operations.

Step 110 generates a set of light fragments representing the portion of the scene visible from the point of view of a light source that is designated to cast soft shadows. Each light fragment represents a sample of the scene from the point of view of the light source. This set of light fragments is stored in a data structure referred to as the light buffer. Each light fragment in the light buffer is associated with an image space position representing the location of the light fragment projected onto an image plane specified by the point of view of the light source. Similar to step 105, step 110 may exclude or mark background fragments in the light buffer to prevent these background portions of the scene from casting shadows.

In an embodiment, step 110 determines attributes for each light fragment in the light buffer including the position of each light fragment in the world space coordinate system (or any other convenient scene-related coordinate system). In a further embodiment, step 110 may also determine a light intensity value for each light fragment, representing the light intensity and optionally the color of light at the position of the light fragment. In another embodiment, step 110 instead determines a shadow intensity for each light fragment, which is the attenuation of light from a maximum value, for example based on the distance of the light fragment to the light source. In a further embodiment, the light intensity (or shadow intensity) can be modified by a light fragment's transparency value, which arises when the light fragment is part of a transparent or translucent object casting a shadow. The light intensity value can be a scalar to provide monochromatic shadows or a vector (including for example separate red, green, and blue intensity values) to provide color shadows. The data structure of the light buffer can be similar to that discussed above with respect to the eye buffer.

A light source can be directional light, such as a spotlight, or an omni-directional light. Light sources have a size and/or shape, which determines the size of the penumbra or partially shadowed region cast by the light source. (Infinitesimally small or point light sources cast sharp shadows). For directional lights, an embodiment of step 110 defines a view frustum and light buffer image plane based on the direction, size, and area of effect of the directional light source. For omni-directional light sources, an embodiment of step 110 defines a view frustum and light buffer image plane based on the size of the light source and the position of the camera or viewer, such that the light source's view frustum covers the camera or viewer's field of view and/or any objects potentially casting shadows within the camera or viewer's field of view. An alternate embodiment of step 110 can use a fish-eye or other omni-directional projection to generate a light buffer with fragments in every direction surrounding the light source.

Following the generation of fragments in the eye buffer and light buffer, step 115 selects a fragment in the eye buffer for processing. In an embodiment, only non-background fragments in the eye buffer are selected. Step 120 defines a frustum for the selected fragment. In an embodiment, step 120 defines the frustum between the selected fragment's position in world space, as stored in the eye buffer, and the boundaries of the light source, as determined by the size and/or shape of the light source. In an embodiment, the frustum can be defined in part by the exact boundaries and shape of the light source. In another embodiment, the light source's boundaries can be approximated by a bounding sphere. In this embodiment, the frustum for the selected fragment can be defined as a cone with a tip or apex located at the selected fragment's position in world space and a base corresponding with a cross-section of the light source's bounding sphere.

Step 125 selects light fragments inside the frustum of the selected fragment. In an embodiment, step 125 projects the selected fragment's frustum into the light source's image plane. Step 125 selects all or a portion of the light fragments in the light buffer that, as projected in the light buffer, reside inside the two-dimensional region defined by projecting the frustum in the plane of the light buffer. However, even if a light fragment projected into the light buffer is inside the two-dimensional region of the projected frustum, the light fragment's position in world space may be outside the frustum itself. Thus, step 125 further evaluates each selected light fragment's world space position against the boundaries of the frustum to determine if the light fragment is inside the frustum.

In an embodiment, step 125 determines the projection of the frustum and selects all of the light fragments residing inside the region of the projection for further evaluation with the frustum itself. In an embodiment, light fragments outside the projected frustum include empty entries or background fragments of the light buffer, which correspond with portions of the scene unaffected by the light source.

In another embodiment, step 125 determines a bounding box or region for the projected frustum and selects all or a portion of the light fragments residing inside this bounding box region for further evaluation with the frustum itself. In still another embodiment, step 125 defines a major axis of the frustum as the line between the selected fragment of the eye buffer in world space and the center of the light source in world space and projects the major axis onto the light image plane. Step 125 then selects all or a portion of the light fragments along or near the major axis for further evaluation with the frustum itself.

Following step 125, a set of all or a representative portion of the light fragments having world space positions within the frustum of the selected fragment will be used to determine the illumination value of the selected fragment.

Step 130 determines an illumination value for the selected fragment of the eye buffer by evaluating the set of light fragments selected in step 125. The intensity values of the selected light fragments represent (or approximate) the amount of light from the light source that is blocked from the selected fragment of the eye buffer.

In an embodiment, step 130 sums the intensity values of the selected light fragments to determine an illumination value for the selected fragment of the eye buffer. In another embodiment, it is assumed that each light fragment's intensity value represents the amount of light attenuated over a volume of space between the light source and the light fragment, and thus step 130 multiplies the selected light fragments' intensities to determine an illumination value for the selected fragment of the eye buffer. In still a further embodiment, step 130 may normalize or scale the illumination value of the selected fragment of the eye buffer based on the total number of selected light fragments or based on the ratio of selected light fragments to the total number of light fragments in the projected frustum or any approximation thereof, such as a bounding box. In this case of colored lights and shadows, illumination values can be determined by processing light fragment intensity values on a per color or component basis.

Step 135 determines a shaded value of the selected fragment in the eye buffer. Typically, the shaded value of the selected fragment includes color information (e.g. red, green, and blue values). In an embodiment, a renderer determines the shaded value of the selected fragment of the eye buffer from the fragment's illumination value and other fragment attributes used in rendering, such as color, transparency, reflectivity, surface normal vectors, and texture mapping coordinates, as well as the execution of one or more shading programs. For example, step 135 can blend, for example by scaling, the unshaded value of the selected fragment with the fragment's illumination value.

Following step 135, method 100 returns to step 115 to select another fragment in the eye buffer for processing. Once all of the fragments in the eye buffer have been processed, the contents of the eye buffer are ready to be displayed or further processed by other rendering operations. In a further embodiment, method 100 can be repeated for additional light sources. In another embodiment, each light source is evaluated several times with the depth of near clipping plane of the light source view frustum changed, in a process referred to as depth peeling. Depth peeling provides improved shadow quality when rendering objects with complex light occlusion and scattering properties, such as a model of a tree with thousands of leaves. In further embodiments, the results of step 105 can be cached and reused for multiple light sources and/or depth layers. In additional embodiments, the light buffers created by step 110 can be cached for reuse in additional frames if the lights and occluders are static or change minimally.

In another embodiment, all of the other attributes of the selected fragment of the eye buffer are processed prior to step 135, for example in step 105 or in parallel with method 100, to determine an unshaded value of the selected fragment, which may be stored in the eye buffer or a different buffer, such as an unshaded image buffer. Step 130 may also create a shading buffer storing the illumination values for all of the fragments evaluated from the eye buffer. Step 135 can then blend the shading buffer with the unshaded image buffer on a per-fragment basis to determine a shadowed and optionally shaded image.

Moreover, as discussed in detail below, steps 115, 120, 125, 130, and 135 can be performed for multiple fragments in parallel using, for example, single instruction single data (SISD) operations or SIMD operations executed by one or more processors or processor cores.

Figure 2A:
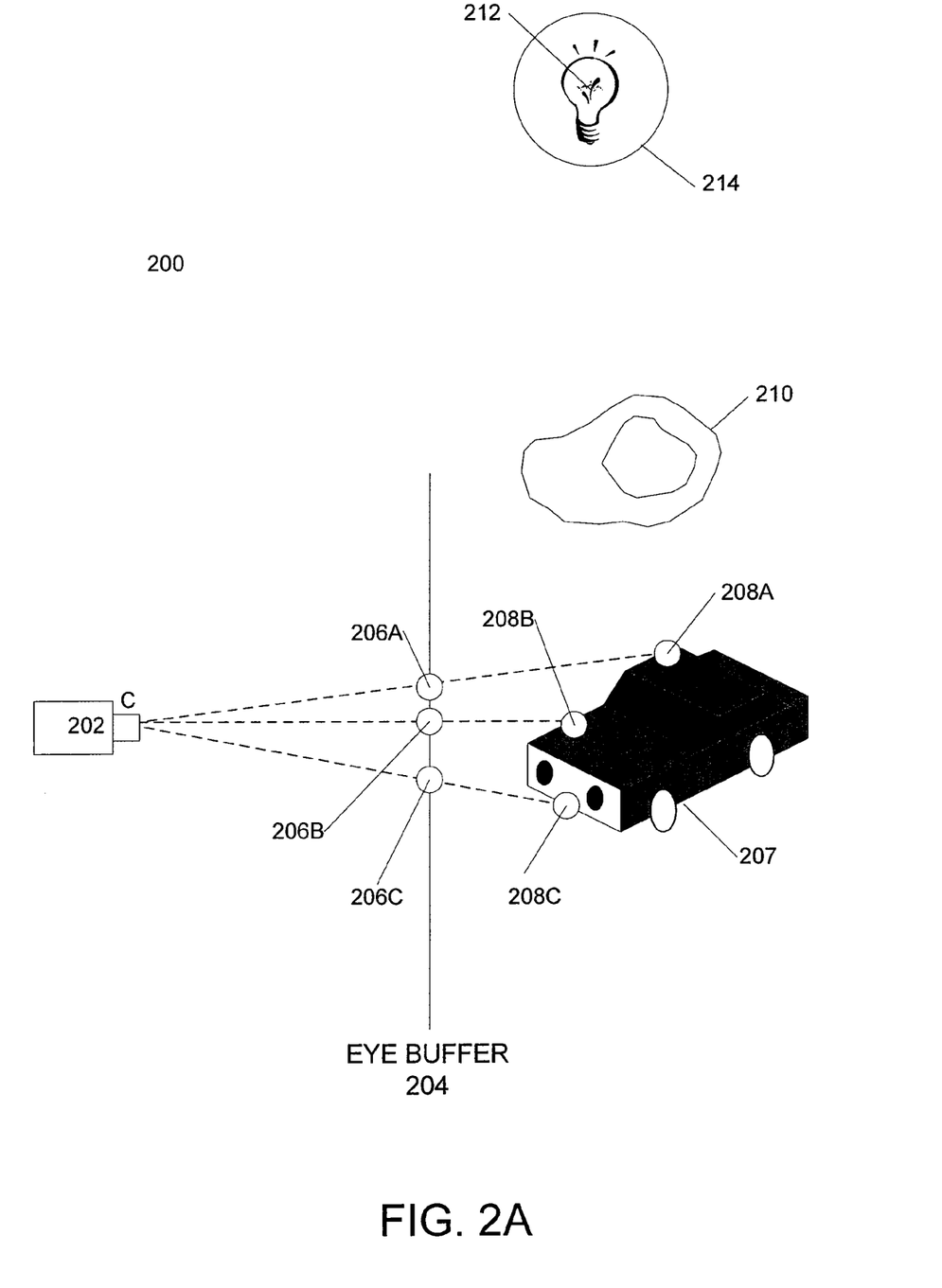
FIGS. 2A-2E illustrate example applications of the steps of a method of generating soft-shadows according to an embodiment of the invention.

FIGS. 2A-2E illustrate example applications of the steps of a method of generating soft-shadows according to an embodiment of the invention. FIG. 2A illustrates an example application 200 of step 105 creating fragments for an eye buffer. Example 200 includes a virtual camera 202 representing the point of view of a viewer of a scene. A scene is rendered from the position of the virtual camera 202 to generate fragments in eye buffer 204.

As discussed above, the eye buffer 204 stores attributes of fragments including the fragments' positions in a world space coordinate system. For example, eye buffer 204 includes entries 206A, 206B, and 206C. Eye buffer entries 206A, 206B, and 206C correspond with fragments 208A, 208B, and 208C, respectively, of an object 207 projected onto the plane of the eye buffer 204. As shown in FIG. 2A, fragments 208A, 208B, and 208C have positions in world space.

As discussed in detail below, this example 200 includes at least one light source 212, which has a size represented by bounding sphere 214, and at least one object, referred to as an occluder 210, casting a shadow from the light source 212.

Figure 2B:
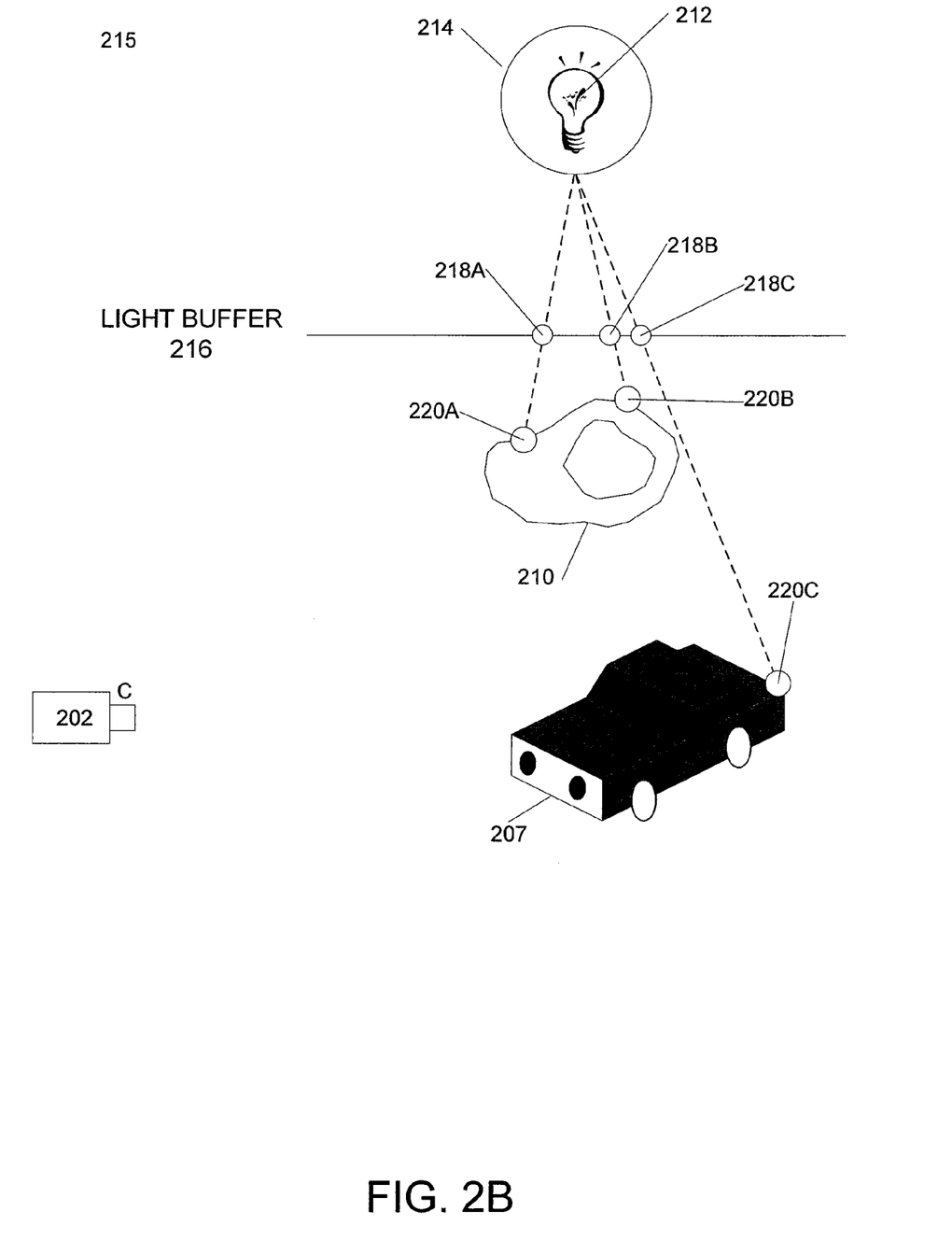

FIG. 2B illustrates an example application 215 of step 110 creating light fragments for a light buffer 216. In this example, the scene is rendered from the position of the light source 212 to generate light fragments for the light buffer 216. As discussed above, the light buffer 216 stores attributes of light fragments, including the light fragments' positions in a world space coordinate system and intensity values representing the amounts of light received or blocked by the light fragments. For example, light buffer 216 includes entries 218A, 218B, and 218C. Light buffer entries 218A, 218B, and 218C correspond with light fragments 220A, 220B, and 220C, respectively, which are fragments of the occluder 210 and the object 207 that receive light from light source 212. Although example 215 illustrates a single occluder 210, fragments from any number of occluders can be included in the light buffer 216 with no or only a nominal increase in processing time. As shown in FIG. 2B, light fragments 220A, 220B, and 220C have positions in world space.

Figure 2C:
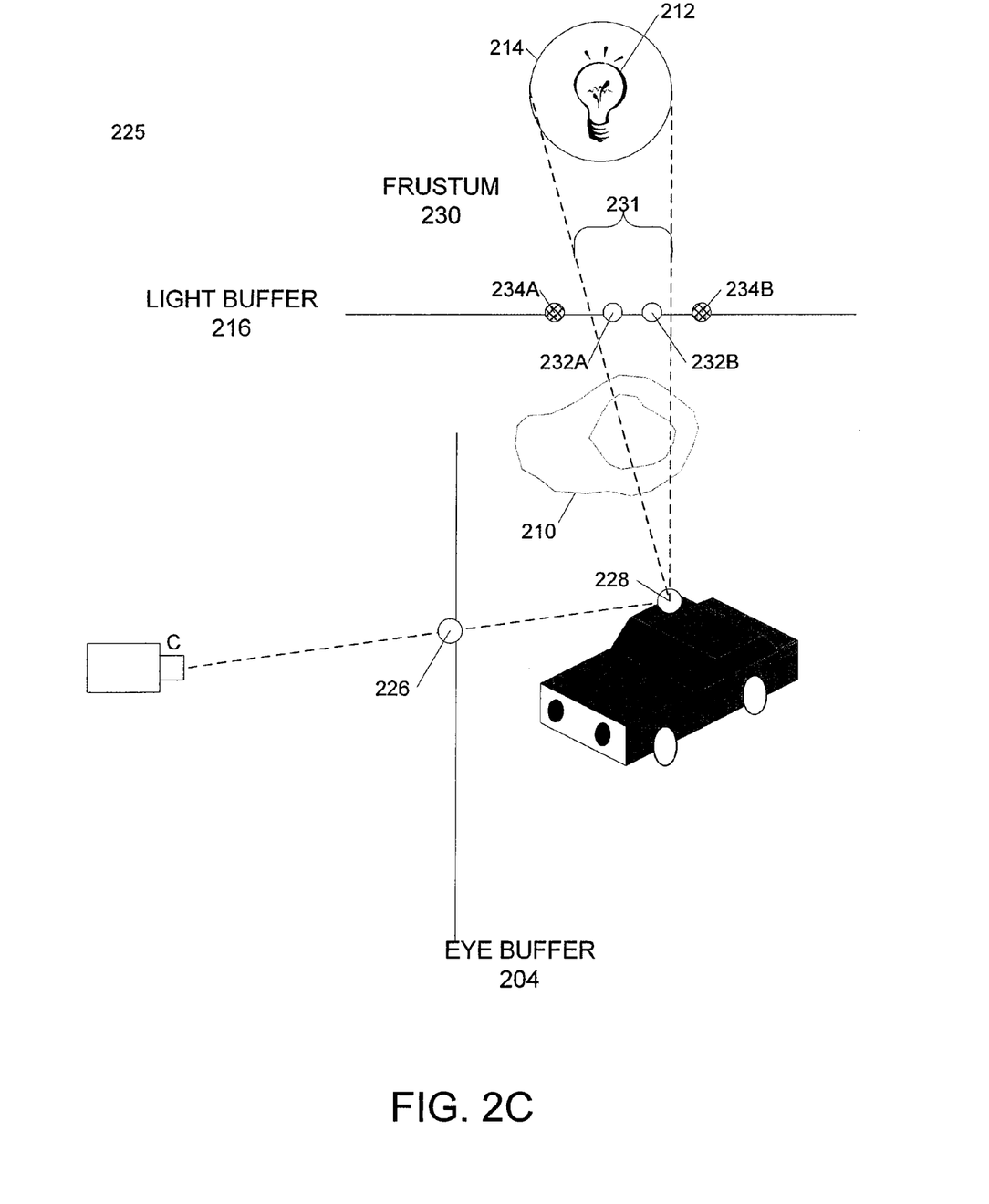

FIG. 2C illustrates an example application 225 of steps 115, 120, and 125. In example 225, an entry 226 of the eye buffer 204 is selected and its corresponding fragment 228 in world space is identified. A frustum 230 is defined between the location of fragment 228 in world space and the boundaries 214 of the light source 212. In an embodiment, this frustum 230 forms a cone. However, in alternate embodiments, other shapes such as tetrahedrons can be used.

The frustum 230 is projected into the plane of the light buffer 216. This projection defines a region 231 in which all or a portion of the light fragments in light buffer will be evaluated to determine the illumination value of fragment 228. For example, light fragments 232A and 232B fall within region 231 and may potentially contribute to the illumination value of the fragment 228. Conversely, light fragments 234A and 234B fall outside the region 231 and do not affect fragment 228.

Figure 2D:
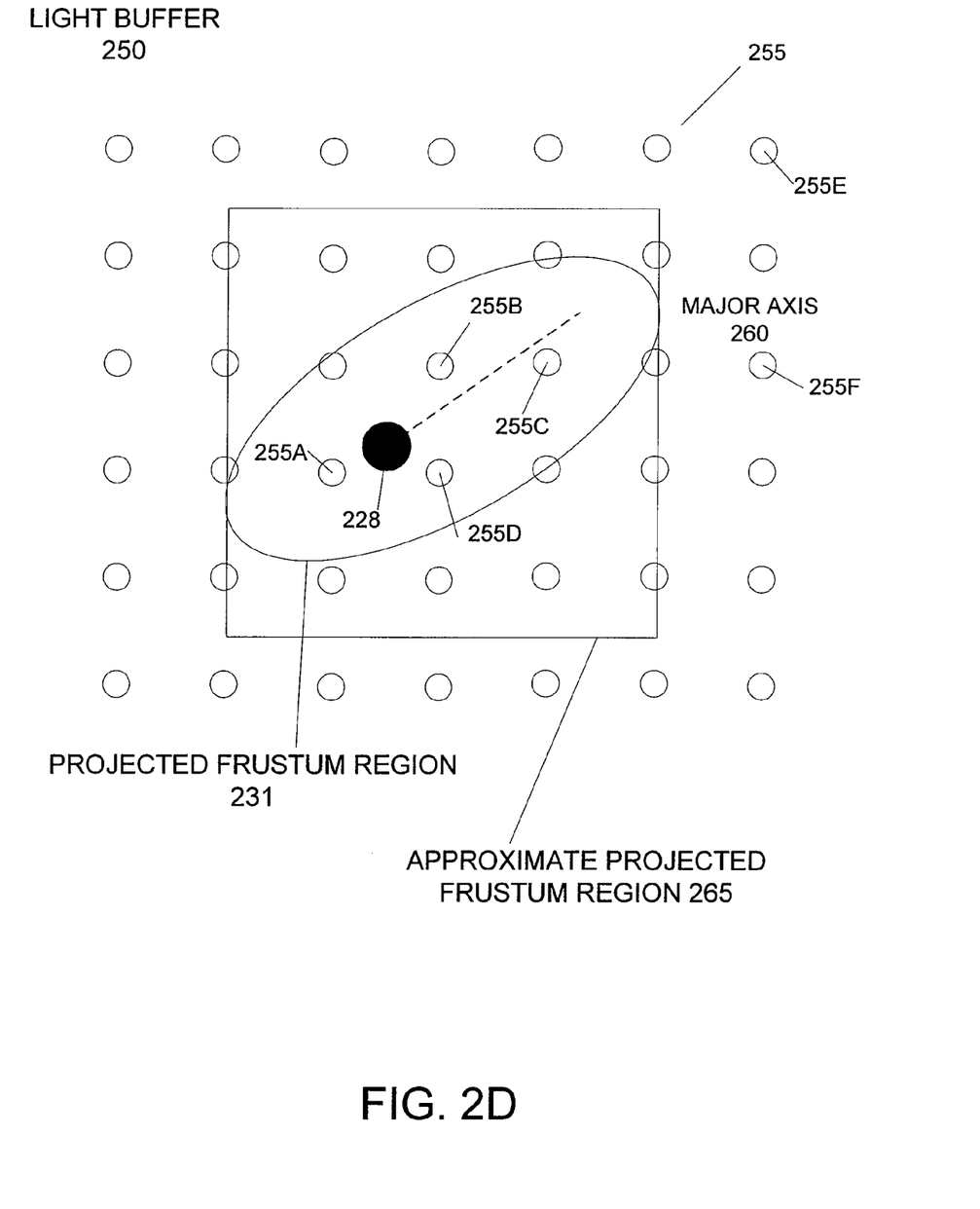

FIG. 2D illustrates the projection of the frustum in the light buffer 250 in more detail. Light buffer 250 includes a set of light fragments 255, such as light fragments 255A, 255B, 255C, 255D, 255E, and 255F. The projection of the frustum defines two-dimensional region 231 in the light buffer 250. FIG. 2D also shows the selected fragment 228 from the eye buffer projected into the light buffer 250.

In an embodiment, all or some of the light fragments within the region 231 may be evaluated to determine the illumination value of the selected fragment. In another embodiment, an approximate region 265, such as a bounding box, is used to approximate the region 231 and all or some of the light fragments within this approximate region 265 are evaluated to determine the illumination value of the selected fragment. In another embodiment, all or some of the light fragments on or near the projection of the major axis 260 of the frustum are evaluated to determine the illumination value of the selected fragment.

A discussed above, a light fragment does not affect the shadowing of a selected fragment from the eye buffer unless the light fragment's world space position is inside the three-dimension frustum defined between the selected fragment from the eye buffer and the light source. In an embodiment, the frustum of a fragment is projected into the light buffer to define a two dimensional region, such as projected frustum region 231 or approximate projected frustum region 265 in FIG. 2D. All or a portion of the light fragments within the two-dimensional region are selected for evaluation. For example, light fragments 255A, 255B, 255C, and 255D, as projected in the light buffer 250, fall within the projected frustum region 231 and are thus selected for further evaluation.

In an embodiment of step 125, the subset of light fragment within the projected frustum region or an approximation thereof have their world space positions evaluated to determine if they are inside the three-dimensional frustum. For example, step 125 further evaluates the world space positions of light fragments 255A, 255B, 255C, and 255D to determine if they fall within the three-dimensional frustum. If light fragments lie within the frustum, then the shadow computation is performed as described above. However, if a light fragment's world space position is outside of the frustum, then the light fragment is ignored for purposes of the shadow computation.

Figure 2E:
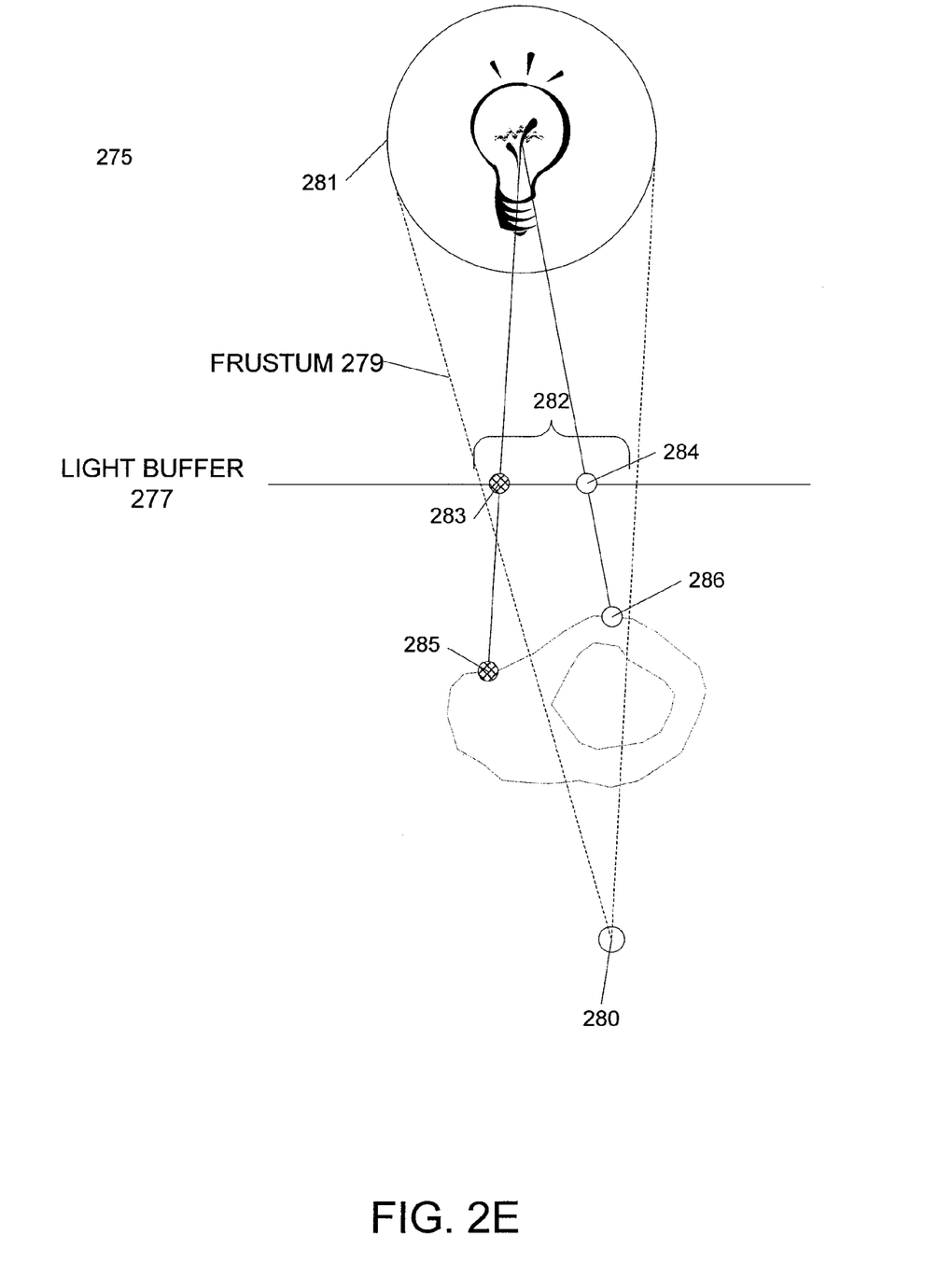

In some cases, although a light fragment's projected position in the light buffer may be within the projected frustum region; however, the light fragment's world space position is outside of the frustum and thus does not contribute to the shadowing of a fragment of the eye buffer. FIG. 2E illustrates an example 275 of this case. In example 275, light fragments 285 and 286 are projected into the light buffer at positions 283 and 284, respectively. A fragment 280 from the eye buffer and a light source 281 define a frustum 279. Light fragments within the frustum 279 lie between the fragment 280 and the light source 281 and thus may block some light from light source 281.

The projection of the frustum 279 into the light buffer plane 277 defines region 282. Region 282 includes light fragment positions 283 and 284. However, as can be seen from these fragments' world space positions, light fragment 285 is outside of the frustum 279, while light fragment 286 is inside the frustum 279. Thus, light fragment 286 contributes to the shading of fragment 280, while light fragment 285 does not.

As discussed above, depth peeling can be used to provide improved shadow quality when rendering objects with complex light occlusion and scattering properties. Depth peeling creates several light buffers for a light source. The scene is rendered from the view of the light for each light buffer using a different near clipping plane. As a result, each light buffer includes a different set of fragments occluding or blocking light from the light source.

Figure 3:
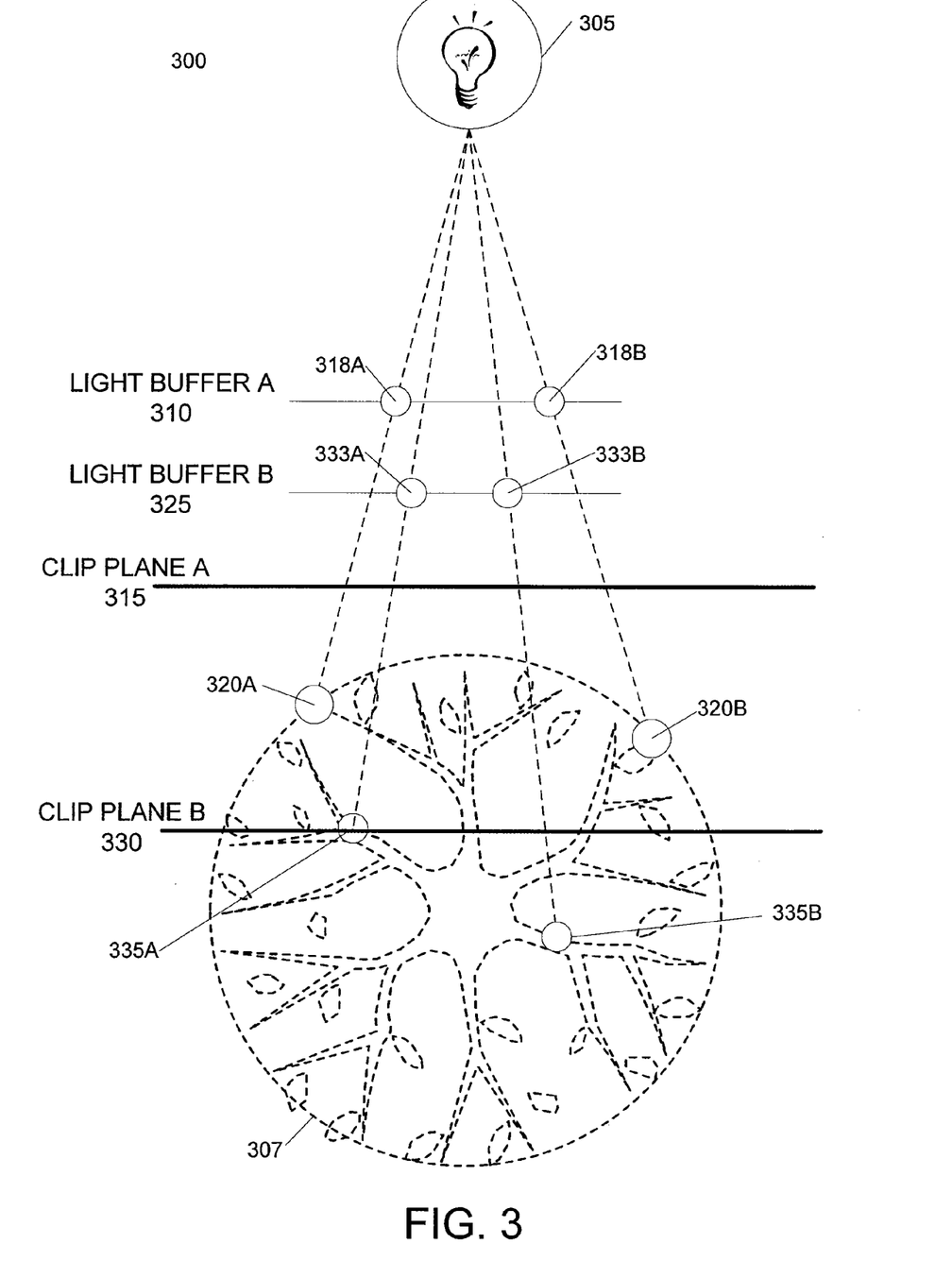
FIG. 3 illustrates an example application of depth peeling suitable for use with an embodiment of the invention.

FIG. 3 illustrates an example application 300 of depth peeling suitable for use with an embodiment of the invention. In this example, the scene is rendered from the position of the light source 305 to generate light fragments for the light buffers 310 and 325.

For light buffer A 310, the scene is rendered with near clipping plane A 315. Near clipping plane A 315 excludes, or clips, all objects between itself and the light source 305. As a result, light buffer A 310 will include light fragments from the outer portion of occluder 307. For example, light buffer A 310 can include entries 318A and 318B for light fragments 320A and 320B, respectively.

For light buffer B 325, the scene is rendered with near clipping plane B 330. Typically, near clipping plane B 330 is set to pass through the interior of one or more occluders, such as occluder 307. Near clipping plane B 330 excludes, or clips, all objects between itself and the light source 305. As a result, light buffer B 325 will include light fragments from the interior portion of occluder 307. For example, light buffer B 325 can include entries 333A and 333B for light fragments 335A and 335B, respectively.

Although light buffers 310 and 325 are shown in different positions for clarity, an embodiment of the invention uses the same image plane location for both light buffers, changing only the location of their respective near clipping planes.

As discussed above, the light buffers 310 and 325 store attributes of light fragments, including the light fragments' positions in a world space coordinate system and intensity values representing the amounts of light received or blocked by the light fragments. The light fragments in light buffer 310 represent light blocked by the exterior of occluder 307, while the light fragments in light buffer 325 represent light blocked by the interior of occluder 307. Each fragment in the eye buffer is evaluated against all of the light buffers associated with each light source in a manner similar to that described by method 100. As a result, the illumination values of the fragments of the eye buffer take into account light blocked by the features in both the interior and exterior of the occluder, which approximates the shadowing effects from occluders with complex light occlusion and scattering properties. An embodiment can use additional light buffers with near clipping planes passing through different interior portions of one or more occluders to provide even better approximations of complex shadowing effects, at the cost of increased processing time and memory.

Many computer graphics systems include both a general purpose central processing unit (CPU) as well as specialized graphics processing unit (GPU) adapted to render computer graphics. In some implementations, the method of generating soft shadows can be executed primarily by the GPU. For example, the GPU can generate the eye buffer, an unshaded image, and one or more light buffers; evaluate light fragments for each fragment in the eye buffer using a shader program; and blend illumination values of the fragments of the eye buffer with the unshaded image to create the final shadowed image.

In other implementations, the processing duties of the method of generating soft shadows (and optionally other shading techniques) is split between the GPU and CPU. In these implementations, the GPU is used to generate unshaded or minimally shaded scenes. The final shading, including soft shadow generation, is deferred until after the scene is completely rendered and visibility of all fragments is determined. The CPU can then be used to complete the shading operations, such as soft shadow generation, on the visible fragments. The time required for the deferred shading operations depends only on the resolution of the image and the complexity of the shading operations. The geometric complexity of the underlying scene has no effect on the cost of the deferred shading operations. Deferred shading allows the GPU to concentrate on maximizing scene geometry performance, while the CPU performs shading operations in roughly constant time based on the resolution of the image.

Figure 4A:
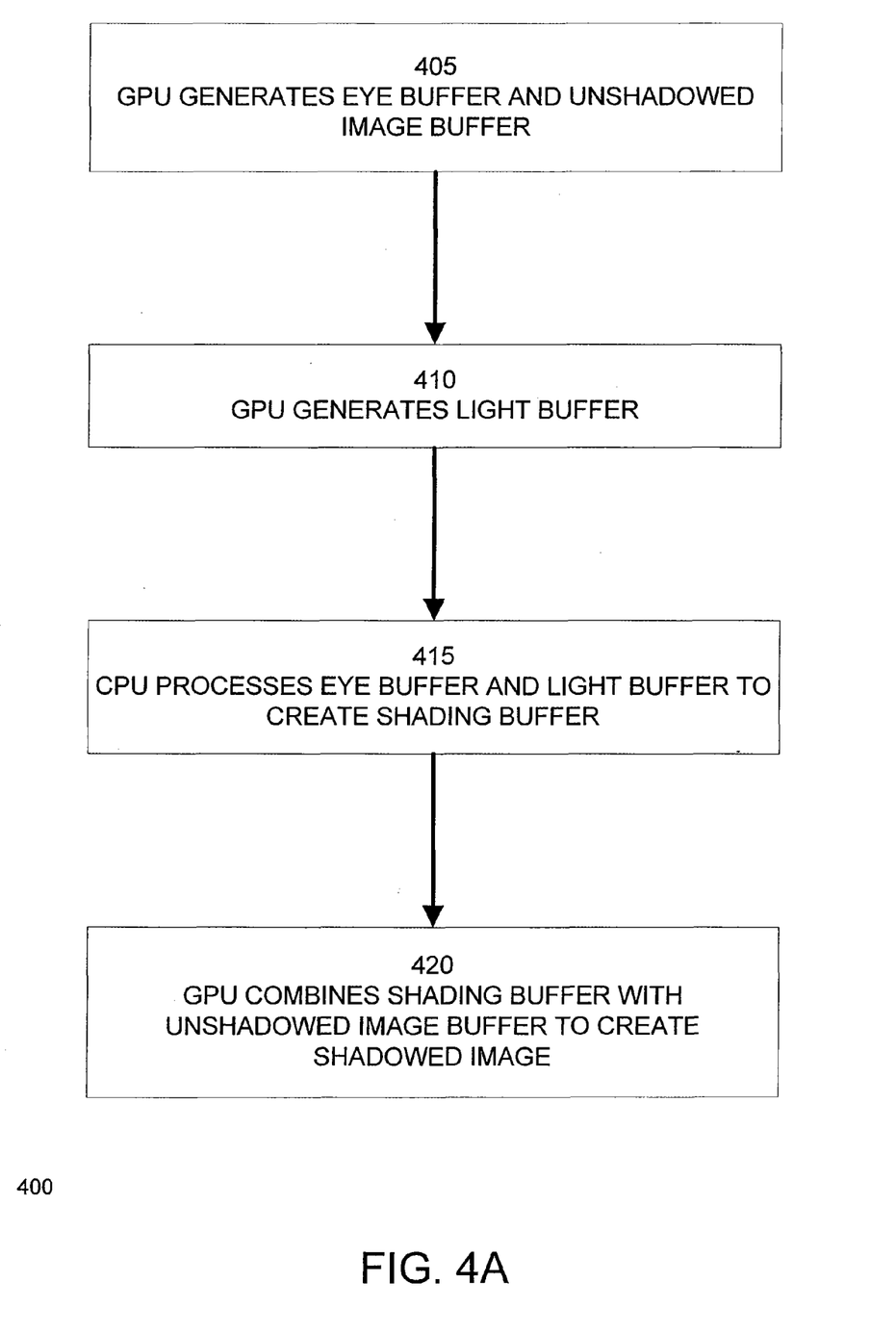
FIGS. 4A-4B illustrate implementations of a method of generating soft shadows according to embodiments of the invention.

FIG. 4A illustrates an implementation 400 of a method of generating soft shadows according to an embodiment of the invention. In step 405, a GPU generates the eye buffer as described above. In a further embodiment, the GPU may simultaneously generate an unshadowed image from the camera viewpoint for later blending with the illumination values. Many GPUs support multiple render targets, which allow multiple image buffers with different attribute values to be created simultaneously from the same scene geometry. Using this feature, the GPU can render the scene from the camera viewpoint to simultaneously create the eye buffer, which stores fragment positions in world space, and the unshadowed image buffer, which can store color and optional attributes, such as transparency and/or depth values.

In step 410, the GPU generates one or more light buffers as described above. The GPU can generate multiple light buffers to support shadows from multiple lights and/or multiple depth layers for each light.

In step 415, the CPU processes the eye buffer and one or more light buffers to create a shading buffer with illumination values for each non-background fragment of the eye buffer.

In step 420, the GPU blends the shading buffer with the unshadowed image previously created to create a shadowed image.

Figure 4B:
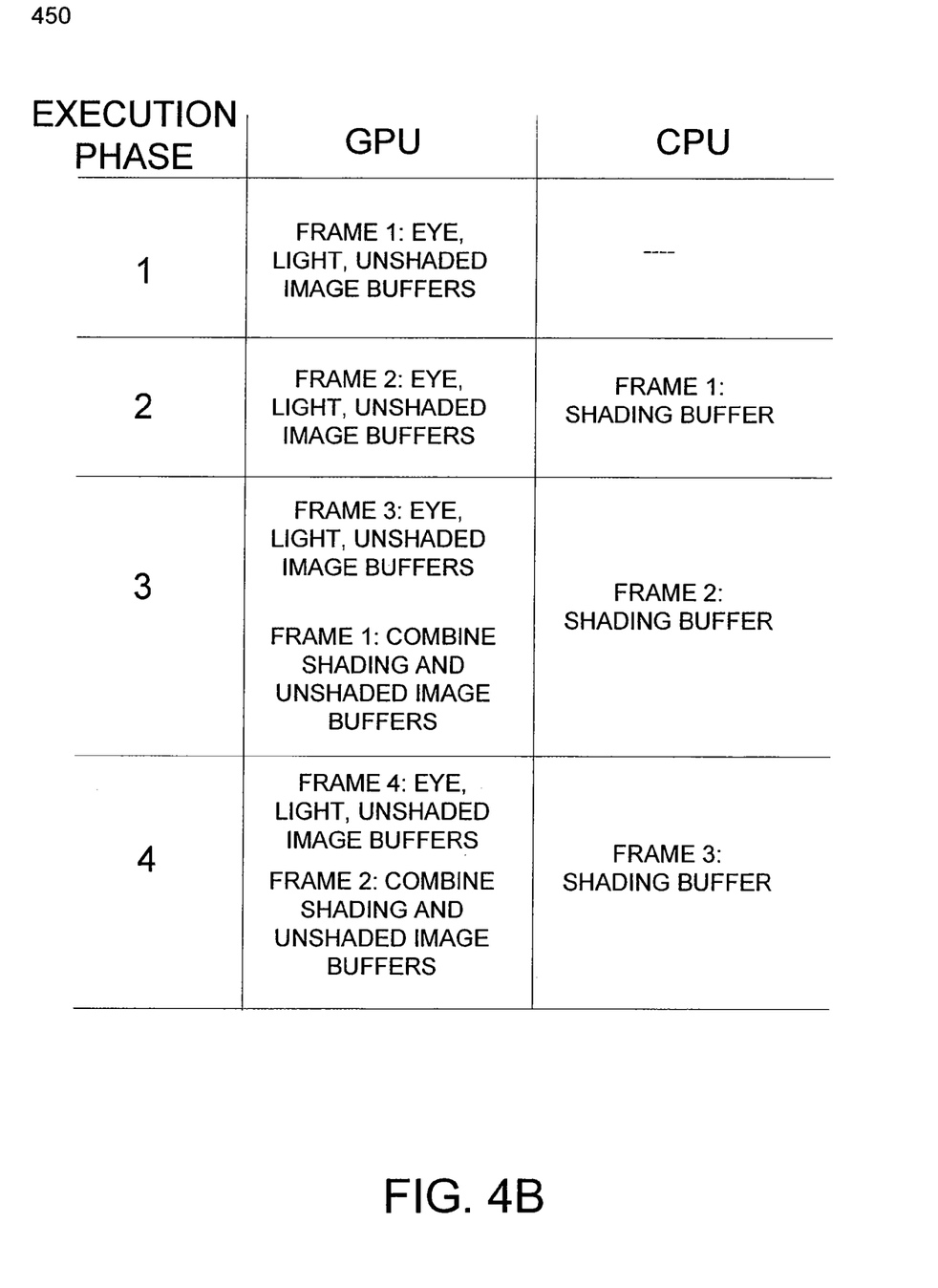

Although the steps of method 400 are shown sequentially, embodiments of method 400 can be executed in parallel and pipelined for multiple frames. FIG. 4B illustrates a table 450 illustrating an example pipelined implementation of method 400. In execution phase 1, the GPU generates the eye buffer, light buffers, and unshaded image for a first frame, frame 1. In execution phase 2, the CPU begins processing the eye buffer and light buffers from frame 1 to create a shading buffer for frame 1. Additionally, the GPU generates the eye buffer, light buffers, and unshaded image for a second frame, frame 2, during execution phase 2.

In execution phase 3, the GPU blends the unshaded image and shading buffer of frame 1 to create a shaded image for frame 1. Frame 1 is then ready for display or for further processing. Additionally, the GPU generates the eye buffer, light buffers, and unshaded image for a third frame, frame 3 during execution phase 3. During execution phase 3, the CPU processes the eye buffer and light buffers from frame 2 to create a shading buffer for frame 2.

In execution phase 4, the GPU blends the unshaded image and shading buffer of frame 2 to create a shaded image for frame 2. Frame 2 is then ready for display or for further processing. Additionally, the GPU generates the eye buffer, light buffers, and unshaded image for a fourth frame, frame 4, during execution phase 4. During execution phase 4, the CPU processes the eye buffer and light buffers from frame 3 to create a shading buffer for frame 3.

This example pipelined execution shown in FIG. 4B can be continued for any number of frames. Alternative pipeline execution arrangements can also be used to accommodate different processing speeds of the GPU and CPU.

Figure 5:
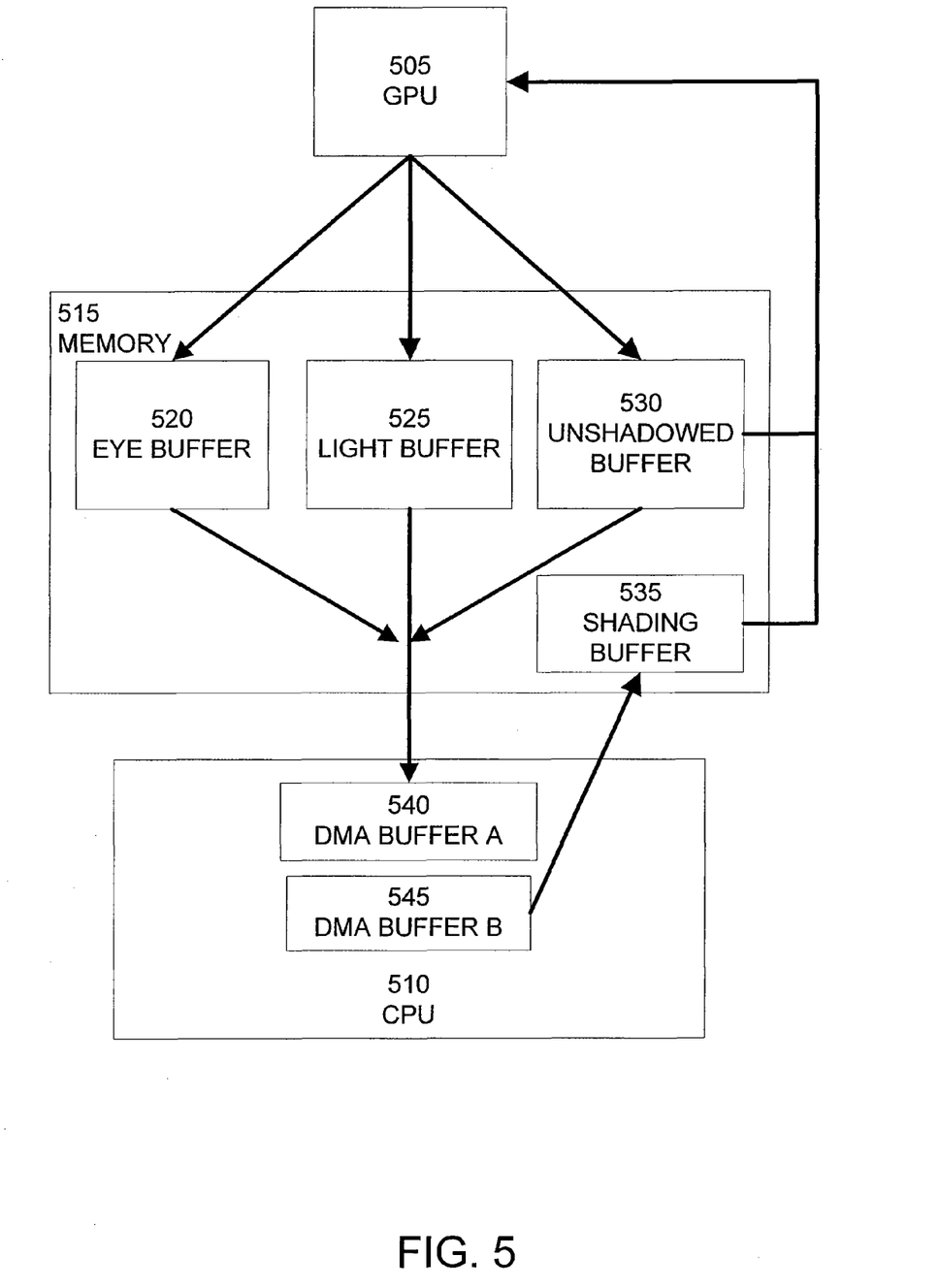
FIG. 5 illustrates details of an implementation of a method of generating soft shadows according to an embodiment of the invention.

FIG. 5 illustrates details of an implementation 500 of a method of generating soft shadows according to an embodiment of the invention. Implementation 500 includes a GPU 505, a CPU 510, and memory 515. In an embodiment, implementation 500 includes a unified memory architecture configured so that memory 515 is readily accessible to both the CPU 510 and GPU 505 with little or no performance penalty. GPU 505 can be configured to create eye buffer 520, light buffers 525, and unshadowed image buffer 530, as described above. CPU 510 can be configured to process eye buffer 520 and light buffers 525 as described above to produce shading buffer 535. The shading buffer 535 can include illumination values used to create soft shadows. In an additional embodiment, the shading buffer 535 can also include values resulting from other lighting, shading, texturing, and other shading program operations executed by the CPU 510. The GPU 505 can then blend shading buffer 535 with unshadowed image buffer 530 to create an image ready for display or additional processing. Additionally, memory 515 can store buffers for multiple frames simultaneously for use with pipelined execution arrangements as described above.

To facilitate efficient processing, several different additional techniques can be employed alone or together. First, if the CPU 510 support SIMD instructions, one or more of the buffers can arrange data in a packed data format to facilitate the processing of multiple operands simultaneously. In some implementations, the GPU 505 may be capable of outputting data for one or more of the buffers directly in the packed data format. In other implementations, swizzling instructions executed by the GPU 505 or CPU 510 can be used to rearrange data into an appropriate packed data format.

A second technique uses direct memory access (DMA) to transfer portions of each buffer as needed between memory 515 and CPU 510. In an embodiment, two sets of DMA transfers are used to overlap computations with data transferred. In this embodiment, data is transferred to and/or from one or more buffers in memory 515 to a first DMA buffer 540 in the cache or local storage of the CPU 510. In parallel with this DMA transfer, the CPU 510 performs computations on the contents of a second DMA buffer 545. When the computations and the DMA transfer are complete, the CPU begins processing data in the first DMA buffer 540 and a new DMA transfer for DMA buffer 545 is initiated. The DMA transfer for buffer 545 transfers processed data back to memory 515, for example into a portion of shading buffer 535, and retrieves additional data, such as data from the eye buffer 520 and light buffer 525 for processing by the CPU 510.

The size of the DMA buffers 540 and 545 can be determined based upon the amount of data to be processed by the CPU 510, the DMA transfer speed and latency, and the amount of cache or local memory storage available in the CPU 510. For example, each DMA transfer can include data for one or more scanlines of a buffer.

Figure 6:
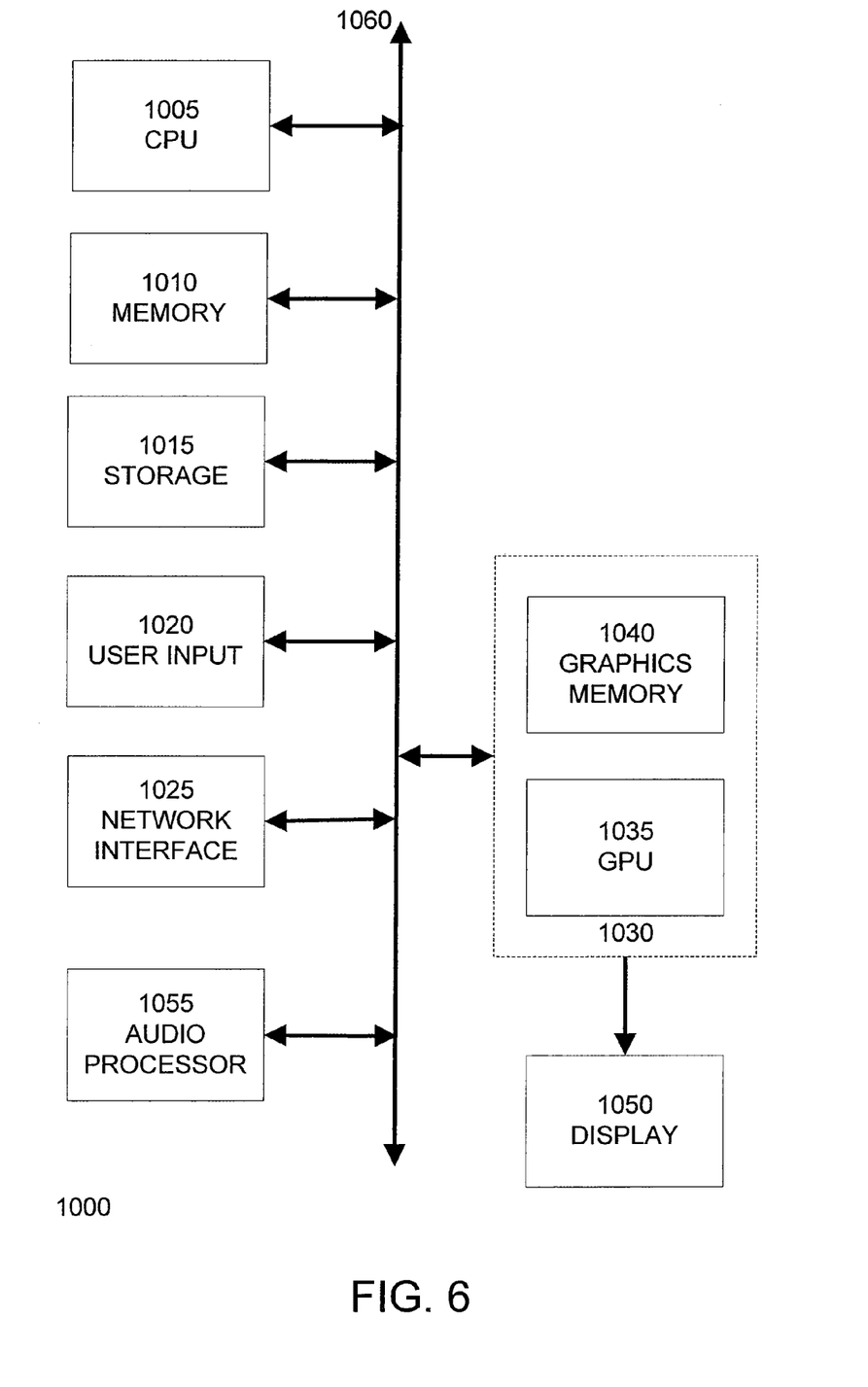
FIG. 6 illustrates an example hardware system suitable for implementing an embodiment of the invention.

FIG. 6 illustrates an example hardware system suitable for implementing an embodiment of the invention. FIG. 6 is a block diagram of a computer system 1000, such as a personal computer, video game console, personal digital assistant, or other digital device, suitable for practicing an embodiment of the invention. Computer system 1000 includes a central processing unit (CPU) 1005 for running software applications and optionally an operating system. CPU 1005 may be comprised of one or more processing cores. Memory 1010 stores applications and data for use by the CPU 1005. Storage 1015 provides non-volatile storage for applications and data and may include fixed disk drives, removable disk drives, flash memory devices, and CD-ROM, DVD-ROM, Blu-ray, HD-DVD, or other optical storage devices. User input devices 1020 communicate user inputs from one or more users to the computer system 1000, examples of which may include keyboards, mice, joysticks, touch pads, touch screens, still or video cameras, and/or microphones. Network interface 1025 allows computer system 1000 to communicate with other computer systems via an electronic communications network, and may include wired or wireless communication over local area networks and wide area networks such as the Internet. An audio processor 1055 is adapted to generate analog or digital audio output from instructions and/or data provided by the CPU 1005, memory 1010, and/or storage 1015. The components of computer system 1000, including CPU 1005, memory 1010, data storage 1015, user input devices 1020, network interface 1025, and audio processor 1055 are connected via one or more data buses 1060.

A graphics subsystem 1030 is further connected with data bus 1060 and the components of the computer system 1000. The graphics subsystem 1030 includes a graphics processing unit (GPU) 1035 and graphics memory 1040. Graphics memory 1040 includes a display memory (e.g., a frame buffer) used for storing pixel data for each pixel of an output image. Graphics memory 1040 can be integrated in the same device as GPU 1035, connected as a separate device with GPU 1035, and/or implemented within memory 1010. Pixel data can be provided to graphics memory 1040 directly from the CPU 1005. Alternatively, CPU 1005 provides the GPU 1035 with data and/or instructions defining the desired output images, from which the GPU 1035 generates the pixel data of one or more output images. The data and/or instructions defining the desired output images can be stored in memory 1010 and/or graphics memory 1040. In an embodiment, the GPU 1035 includes 3D rendering capabilities for generating pixel data for output images from instructions and data defining the geometry, lighting, shading, texturing, motion, and/or camera parameters for a scene. The GPU 1035 can further include one or more programmable execution units capable of executing shader programs.

The graphics subsystem 1030 periodically outputs pixel data for an image from graphics memory 1040 to be displayed on display device 1050. Display device 1050 is any device capable of displaying visual information in response to a signal from the computer system 1000, including CRT, LCD, plasma, and OLED displays. Computer system 1000 can provide the display device 1050 with an analog or digital signal.

Figure 7:
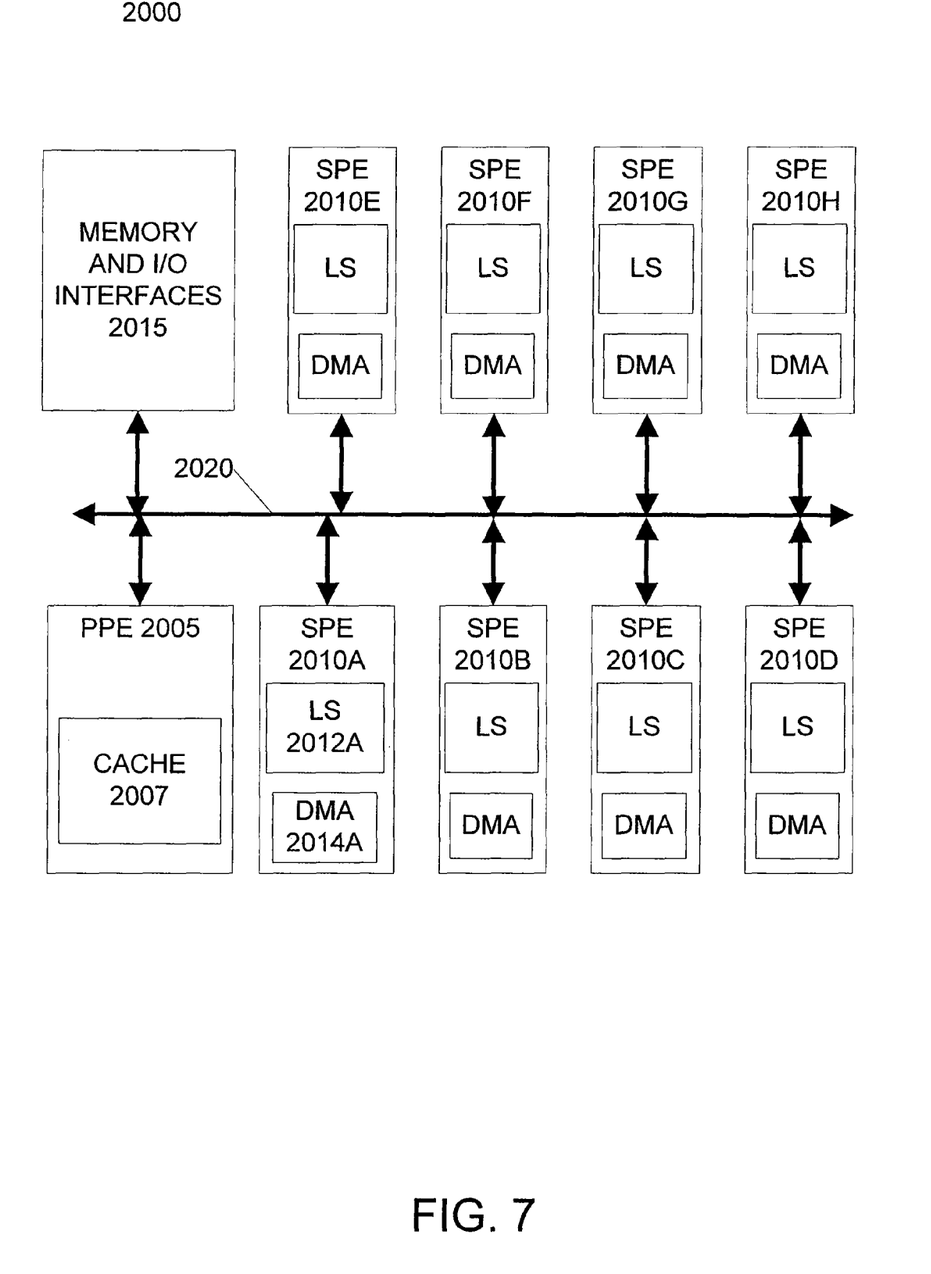
FIG. 7 illustrates an example processor suitable for implementing an embodiment of the invention.

In embodiments of the invention, CPU 1005 is one or more general-purpose microprocessors having one or more processing cores. Further embodiments of the invention can be implemented using one or more CPUs with microprocessor architectures specifically adapted for highly parallel and computationally intensive applications, such as applications providing real-time interactive computer graphics. FIG. 7 illustrates an example processor 2000 suitable for implementing an embodiment of the invention.

Processor 2000 includes a number of processor elements, each capable of executing independent programs in parallel. Processor 2000 includes PPE processor element 2005. PPE processor element is a general-purpose processor of CISC, RISC, or other type of microprocessor architecture known in the art. In one example, PPE processor element 2005 is a 64-bit, multithreaded RISC architecture microprocessor, such as the PowerPC architecture. PPE processor element 2005 can include a cache memory 2007 partitioned into one, two, or more levels of caches temporarily holding data and instructions to be executed by PPE processor element 2005.

For additional performance, processor 2000 includes a number of SPE processor elements 2010. In this example, processor 2000 includes eight SPE processor elements 2010A-2010H; however, other example processors can include different number of SPE processor elements. SPE processor elements 2010 are adapted for stream processing of data. In stream processing, a program is executed repeatedly on each item in a large set of data. To facilitate stream processing, the SPE processor elements 2010 may include instruction execution units capable of executing SIMD instructions on multiple data operands simultaneously. SPE processor elements 2010 may also include instruction units capable of executing single-instruction, single data (SISD) for more general processing tasks.

Each SPE processor element, such as SPE processor element 2010A, includes local data and instruction storage 2012A. Data and instructions can be transferred to and from the local data and instruction storage 2012A via DMA unit 2014A. The DMA units, such as unit 2014A, are capable of transferring data to and from each of the SPE processor elements 2010 without processor supervision, enabling the SPE processor elements 2010 to process data continuously without stalling.

Data and instructions are input and output by the processor 2000 via memory and I/O interfaces 2015. Data and instructions can be communicated between the memory and I/O interfaces 2015, the PPE processor element 2005, and SPE processor elements 2010 via processor bus 2020.

Further embodiments can be envisioned to one of ordinary skill in the art from the specification and figures. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of generating shadows in a computer graphics image, the method comprising:
   receiving a position corresponding to a surface of an object in a three-dimensional scene, the surface position visible from a virtual camera viewpoint;
   receiving a light fragment representing a portion of the scene from a point of view of a light source;
   defining, using a processor operatively connected to a memory, a frustum having an apex located at the surface position and a base defined by a size and a position of the light source;
   projecting the frustum onto an image plane associated with the light fragment to determine a projected two-dimensional frustum region,
   determining whether the light fragment is within an approximate projected frustum region that approximates but is not exactly the projected two-dimensional frustum region; and altering a shading value of the surface position at the apex based on the determination of the light fragment, representing the portion of the scene from the point of view of the light source, being within the approximate projected frustum region.

2. A method of generating shadows in a computer graphics image, the method comprising:
receiving a position corresponding to a surface of an object in a three-dimensional scene, the surface position visible from a virtual camera viewpoint;
receiving a light fragment representing a portion of the scene from a point of view of a light source;
defining, using a processor operatively connected to a memory, a frustum having an apex located at the surface position and a base defined by a size and a position of the light source;
projecting the frustum into an image plane associated with the light fragment to determine a projected two-dimensional frustum region;
defining an approximate projected frustum region that approximates but is not exactly the projected two-dimensional frustum region;
evaluating whether the light fragment is within the approximate projected frustum region in order to determine whether the light fragment is within the frustum; and
altering a shading value of the surface position at the apex based on the determination of the light fragment being within the frustum.

3. The method of claim 2, wherein the approximate projected frustum region is a rectangle.

4. The method of claim 1, further comprising:
determining the position by rendering the object from the virtual camera viewpoint; and
creating the light fragment by rendering a portion of the scene from the point of view of the light source.

5. The method of claim 4, wherein rendering the portion of the scene from the point of view of the light source comprises:
rendering a portion of the object in the scene using a first near clipping plane to create a first set of light fragments; and
rendering the portion of the object in the scene using a second near clipping plane to create a second set of light fragments.

6. The method of claim 1 wherein the frustum is a cone and the base of the frustum corresponds with a cross-section of a bounding sphere of the light source.

7. The method of claim 1 wherein altering the shading value of the surface position comprises scaling an unshaded visual attribute value of the surface position according to the shading value.

8. The method of claim 1, wherein the shading value represents a light intensity received by the visible surface position from the light source.

9. The method of claim 8, wherein the shading value further represents a light color received by the visible surface position from the light source.

10. The method of claim 1, wherein the shading value includes a sum of attribute values associated with the light fragment.

11. The method of claim 1, wherein the shading value includes a product of attribute values associated with the light fragment.

12. The method of claim 1, wherein the light fragment includes an attribute value indicating an amount of light blocked from the light source by an occluder.

13. The method of claim 12, wherein the attribute value is determined at least in part by a color attribute of the occluder.

14. The method of claim 12, wherein the attribute value is determined at least in part by a distance between the light source and the light fragment.

15. The method of claim 12, wherein the attribute value is determined at least in part by an opacity or transparency attribute of the occluder.

16. The method of claim 1, wherein processor includes a graphics processing subsystem.

17. The method of claim 1, wherein the receivings, defining, determining, and altering are performed by the processor.

18. The method of claim 1, wherein the receivings, defining, determining, and altering are performed in the order as shown in claim 1.

19. A machine-readable non-transitory medium embodying information indicative of instructions for causing one or more machines to perform operation comprising:
receiving a position corresponding to a surface of an object in a three-dimensional scene, the surface position visible from a virtual camera viewpoint;
receiving a light fragment representing a portion of the scene from a point of view of a light source;
defining a frustum having an apex located at the surface position and a base defined by a size and a position of the light source;
projecting the frustum onto an image plane associated with the light fragment to determine a projected two-dimensional frustum region;
determining whether the light fragment is within an approximate projected frustum region that approximates but is not exactly the projected two-dimensional frustum region; and
altering a shading value of the surface position at the apex based on the determination of the light fragment, representing the portion of the scene from the point of view of the light source, being within the approximate projected frustum region.

20. A computer system executing instructions set forth in a computer program, comprising:
a processor;
a memory operatively coupled to the processor,
wherein the processor executes instructions in a computer program comprising:
program code for receiving a position corresponding to a surface of an object in a three-dimensional scene, the, surface position visible from a virtual camera viewpoint;
program code for receiving a light fragment representing a portion of the scene from a point of view of a light source;
program code for defining, a frustum having an apex located at the surface position and a base defined by a size and a position of the light source;
program code for projecting the frustum onto an image plane associated with the light fragment to determine a projected two-dimensional frustum region;
program code for determining whether the light fragment is within an approximate projected frustum region that approximates but is not exactly the projected two-dimensional frustum region; and
program code for altering a shading value of the surface position at the apex based on the determination of the light fragment, representing the portion of the scene from the point of view of the light source, being within the approximate projected frustum region.

* * * * *